Sept. 3, 1957  J. N. BRUCE  2,805,037
PILOT CONTROLLED MAIN VALVE FOR HIGH PRESSURE LINES
Filed July 27, 1951  3 Sheets-Sheet 1

Inventor
JOHN N. BRUCE
By George Renshaw
Attorney

Sept. 3, 1957 J. N. BRUCE 2,805,037
PILOT CONTROLLED MAIN VALVE FOR HIGH PRESSURE LINES
Filed July 27, 1951 3 Sheets-Sheet 2
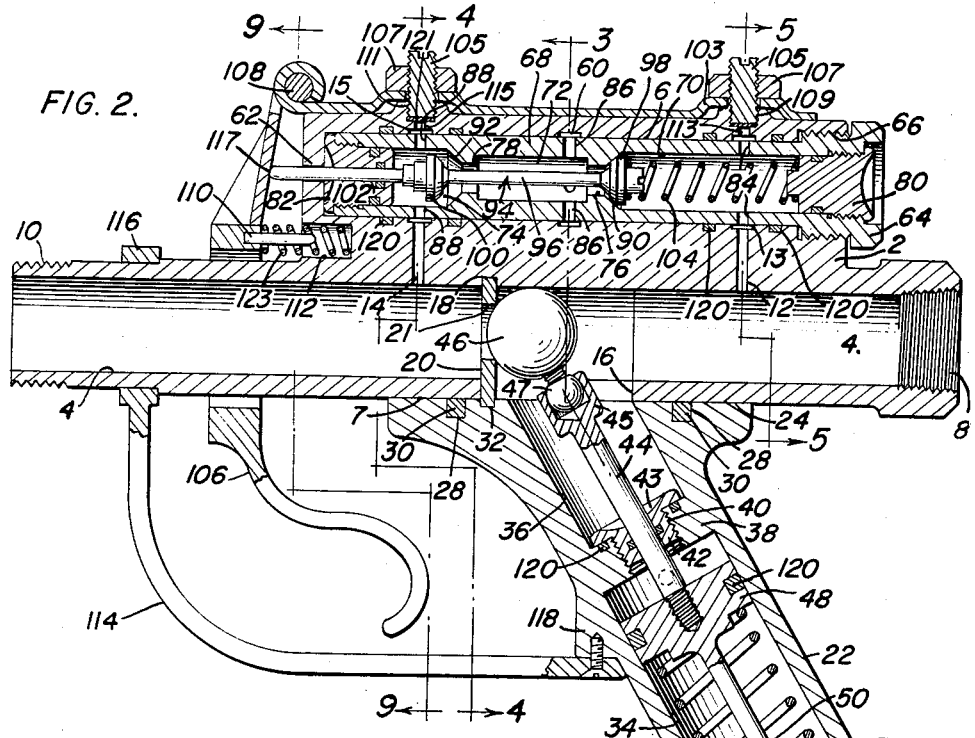
FIG. 2.
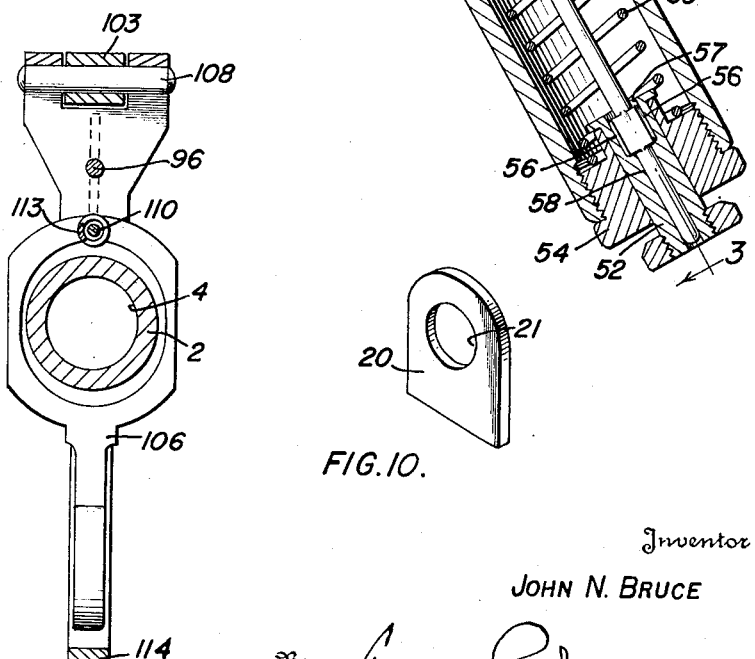
FIG. 9.
FIG. 10.
Inventor
JOHN N. BRUCE
By George Newhan
Attorney Sept. 3, 1957 J. N. BRUCE 2,805,037
PILOT CONTROLLED MAIN VALVE FOR HIGH PRESSURE LINES
Filed July 27, 1951 3 Sheets-Sheet 3

Inventor
JOHN N. BRUCE
By George Renshaw
Attorney

United States Patent Office 2,805,037
Patented Sept. 3, 1957

2,805,037

PILOT CONTROLLED MAIN VALVE FOR HIGH PRESSURE LINES

John N. Bruce, Edgewood, Md.

Application July 27, 1951, Serial No. 238,986

3 Claims. (Cl. 251—25)

(Granted under Title 35, U. S. Code (1952), sec. 266)

The invention described herein may be manufactured and used by or for the Government for governmental purposes without the payment to me of any royalty thereon.

This invention relates generally to a device for controlling the flow of liquids and semi-liquids. The device is particularly adapted to control the flow of fluids that are under very high pressure.

It has long been desired to produce a fluid flow control device which would control the flow of fluids under very high pressure by a finger responsive control and yet one which would completely stop the flow without any leakage when it is desired to stop the flow. Since these two attributes, i. e., finger responsive control and positive stoppage of flow are somewhat inconsistent, the desired structure has never been effectively provided. The reason that finger responsive control and positive stoppage of flow are somewhat inconsistent, is that in order to obtain positive stoppage the fluid pressure is generally utilized to seat the valve, and positive seating of the valve in this manner generally makes finger responsive control for opening the valve very difficult, for it is necessary to overcome the very high pressure which seats the valve. It is therefore an object of this invention to provide a device with these desirable features. I have accomplished this object by providing a device that resolves the apparent inconsistency of the two desired features by utilizing a portion of the fluid pressure that firmly seats the control valve to unseat the control valve, and thereby make finger control possible.

Another object of my invention is to provide a fluid flow control device which is capable of controlling the flow of fluids under very high pressure and which when in its open position permits maximum flow of the fluid by having its main valve completely withdrawn from the conduit through which the fluid flows.

A further object of this invention is to provide a finger responsive fluid flow control device having a leakproof valve and a safety mechanism for preventing unintended unseating of the valve by the accidental actuation of the finger responsive control means.

A specific object of this invention is to provide a fluid flow control arrangement that is adapted to be utilized in a device such as a flame thrower wherein a liquid or semi-liquid fuel is ejected through a conduit under very high pressures, such as 350 p. s. i. and above. In this type of device, it is imperative that the operator have trigger control over the ejection of the liquid or semi-liquid fuel.

A very specific object of this invention is to provide a dispensing nozzle for a flame thrower which includes a fuel flow control arrangement that is actuated by a finger control.

With the foregoing objects in view, together with such other objects and advantages as may subsequently appear, the invention resides in the parts and in the combination, construction and arrangement of parts hereinater described and claimed, and illustrated by way of example in the accompanying drawings, in which:

Fig. 2 is a sectional view taken in a vertical plane which passes through the device.

Figure 1:
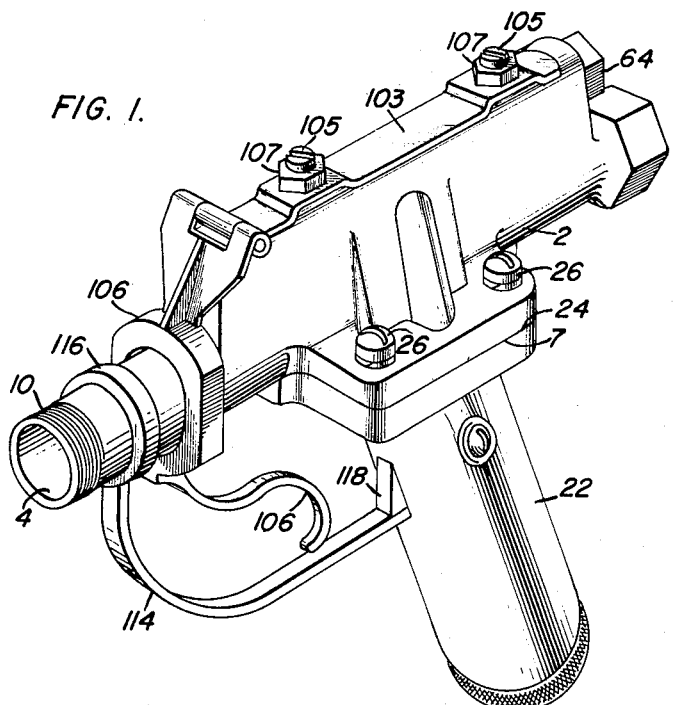
Fig. 1 is a perspective view of the device.
Figure 4:
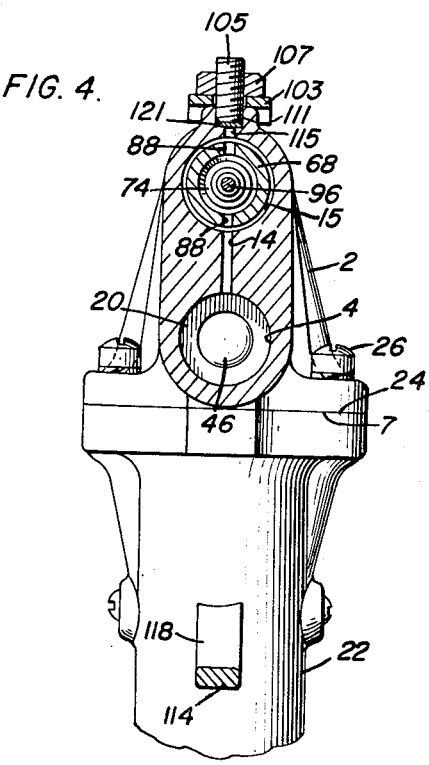
Fig. 4 is a sectional view taken on line 4—4 of Fig. 2.
Figure 5:
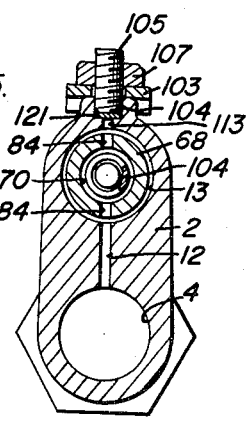
Fig. 5 is a sectional view taken on line 5—5 of Fig. 2.
Figure 3:
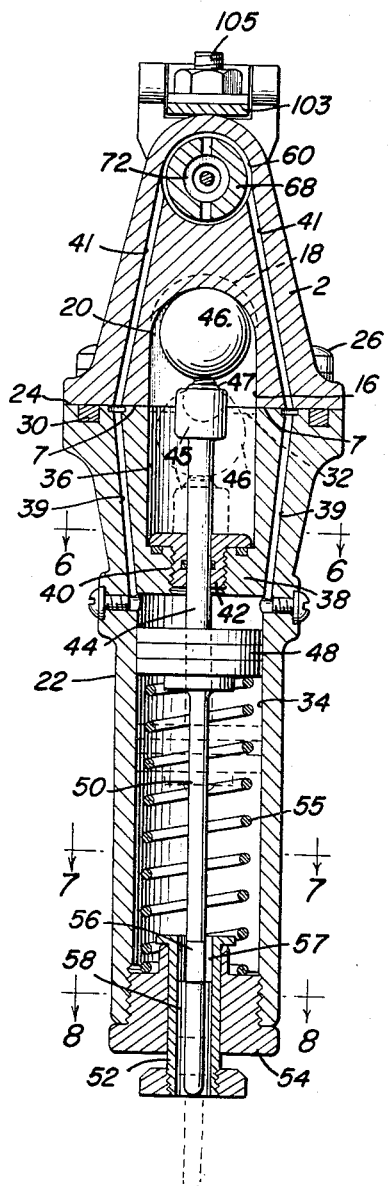
Fig. 3 is a sectional view taken on or near line 3—3 of Fig. 2 with some parts shown in elevation and with the ball valve assembly in its retracted position shown in dotted lines.
Figure 6:
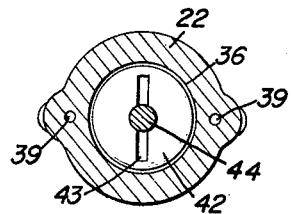
Figure 7:
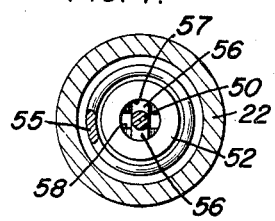
Figure 8:
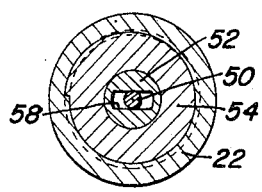

Figs. 6, 7, and 8 are sectional views taken respectively on lines 6—6, 7—7, and 8—8 of Fig. 3.

Fig. 9 is a sectional view taken on line 9—9 of Fig. 2.

Fig. 10 is a perspective view of one of the parts of the device.

Referring to the drawings, the device comprises a body member 2 having formed therein a conduit 4 and a bore 6. Conduit 4 comprises the main passageway through which the fluid under pressure flows. The central portion 7 of the lower surface of body member 2 is flat and the ends are tubular and threaded at 8 and 10 to facilitate attachment of the body member to other sections of conduit. As illustrated, threaded end 8 constitutes the inlet end and is connected to a source of fluid under pressure, and threaded end 10 is connected to the outlet barrel assembly. Ports 12 and 14 extend between the conduit 4 and annular grooves 13 and 15 respectively, which are formed in the bore 6. At a point midway between the ports 12 and 14, conduit 4 is provided with an opening 16 on the lower side of the conduit. An arcuate groove 18 is provided in the body member 2 in the upper wall of conduit 4 in a plane which intersects an edge of opening 16 and is disposed transversely to the conduit. Valve seat 20 (see Fig. 10), which comprises an apertured plate with a flat bottom, flat sides and a curved top is positioned in groove 18. Aperture 21 formed in plate 20 constitutes a valve passage which may be closed by a ball valve which will be described subsequently.

Grip member 22 has a flat upper surface 24 that contacts the flat surface 7 of the body member 2 and is secured thereto by bolts 26 which pass through the body member 2 into threaded holes in grip member 22. Circular groove 28 is provided in the surface 24 and houses circular sealing gasket 30. Upper surface 24 is also provided with a straight elongated groove 32 which houses the lower portion of valve seat 20 when the grip member 22 is secured to the body member 2.

Grip member 22 has bores 34 and 36 formed therein which are separated by apertured wall 38. Passageways 39 connect bore 34 with passageways 41 formed in body member 2. Aperture 40 in wall 38 is threaded and receives valve stem guide 42 which slidably supports ball valve stem 44. A kerf 43 is formed in the head of valve stem guide 42 to facilitate mounting said valve stem guide. Valve stem 44 pivotaly carries ball valve 46 at one end through the medium of a ball 47 and socket 45 universal joint and is connected to piston 48 at the other end. Other pivotable joints between the ball valve and the valve stem could be used. Piston 48 is provided with piston rod 50 which is guided in piston rod guide 52 which is rotatably mounted in retainer 54. Compression spring 55 is positioned between the piston 48 and retainer 54. Piston rod 50 has protruding portions 56 formed thereon (see Figs. 2 and 7), which in cross-section substantially form a rectangle. Piston rod guide 52 has a circular bore 57 formed therein which communicates with an opening 58 of the same cross-section as that formed by protruding portions 56. The piston rod guide 52 may be rotated within retainer 54 so as to either bring opening 58 into register with protruding portions 56 and thereby permit piston rod 50 to reciprocate in piston rod guide 52, or to bring them out of register and thereby prevent reciprocation of the piston rod. This arrangement provides a safety feature, in that accidental reciprocation of the piston rod and the resulting unintended unseating of ball valve 46 is prevented by rotating the piston rod guide opening 58 out of register with the protruding portions 56 of the piston rod when the device is not in use (see Fig. 7).

Previously mentioned bore 6 extends into body member 2 to a point where it communicates with bore 62 of smaller diameter. Passages 41 in the body member 2 communicate with annular groove 60 (see Fig. 3) formed at a point midway of the bore 6 (see Fig. 2). Valve control assembly 64 is mounted in bore 6 by a threaded joint at point 66. The valve control assembly 64 comprises a tubular body 68 having chambers 70, 72, and 74 formed therein by two inwardly extending annular flanges 76 and 78 and end plugs 80 and 82. A plurality of ports 84, 86, and 88 are formed in the wall of tubular body 68 at spaced points which connect the chambers 70, 72, and 74 in tubular body 68 with annular grooves 13, 60, and 15 respectively. Flanges 76 and 78 are each formed with an inclined wall 90 and 92 respectively which constitutes a valve seat. Valve assembly 94, which is positioned in tubular body 68, comprises valve stem 96 having valves 98 and 100 mounted thereon and positioned in chambers 70 and 74 respectively. One end of valve stem 96 passes through opening 102 formed in end plug 82 and bore 62. Valve 98 is normally urged against valve seat 90 by compression spring 104 which is positioned between valve 98 and end plug 80. In this normal position, the end of the valve stem 96 which passes through opening 102 and bore 62 extends beyond the wall which contains bore 62.

Bent plate 103 which carries pin 108 at its forward end is secured to the upper surface of body member 2 by threaded memers 105 and their associated lock nuts 107. Threaded members 105 close off threaded bleed openings 109 and 111 which communicate with ports 113 and 115 respectively which in turn communicate with annular grooves 13 and 15 respectively. Appropriate sealing members 121 are provided in bleed openings 109 and 111 to seal off the closure of said bleed openings. Trigger member 106 is pivotably mounted on pin 108 and contacts the protruding end of valve stem 96 at point 117. Pin 110 is fixed to trigger member 106 and is received in chamber 112 which is formed in body member 2. Compression spring 123 surrounds said pin and is positioned in said chamber, abutting trigger member 106 and the inner wall of said chamber. Trigger guard 114, which comprises a curved strip of material with a ring 116 fixed at one end, is mounted on the body member 2 with the ring encircling tubular outlet end 10 and the other end of the strip secured to a boss 118 which is formed on grip member 22. Because the device handles fluids at very high pressures, conventional packing rings of various shapes and sizes indicated generally as 120 are supplied throughout the device wherever a seal is desirable.

Before the device is actuated by pulling the trigger, the position of the various parts is that illustrated in Fig. 2. Ball valve 46 is firmly seated against valve seat 20 by the pressure of the fluid which is admitted through the inlet end 8. Compression spring 104 urges the valve assembly 94 in a direction to seat valve 98 against valve seat 90, and compression spring 55 urges piston 48 to a position wherein ball valve 46 is fully positioned in conduit 4 adjacent to valve seat 20.

When the device is ready to be actuated, the piston rod guide 52 is rotated so as to bring the opening 58 therein into register with the protruding portions 56 on piston rod 50; then the trigger member is pulled and the following occurs: the trigger member urges the valve assembly 94 in a direction which compresses spring 104, unseats valve 98 and seats valve 100 against valve seat 92; fluid under pressure passes from conduit 4, through port 12, annular groove 13, ports 84 and into chamber 70 past valve 98 (which is unseated) into chamber 72, through ports 86, annular groove 60, passageways 41 and 39 and into bore 34 where the fluid under pressure impinges upon the upper surface of piston 48 and forces the piston against the compression spring 55 moving the valve stem 44 in the same direction thereby retracting ball valve 46 out of conduit 2 and into bore 36. The dotted view in Fig. 3 shows the ball valve assembly in its retracted position. In this position, the fluid under pressure may flow through the conduit 4 in a substantially unobstructed manner.

When it is desired to stop the flow of fluid, the trigger member is released and the following occurs: compression springs 123 and 104 expand and urge valve assembly 94 in a direction in which valve 100 is unseated and valve 98 is seated against valve seat 90 and thereby stops the flow of the fluid past valve 98; since this relieves the pressure on the upper surface of piston 48, compression spring 55 expands and forces the piston in a direction in which the ball valve 46 is forced into the conduit 4 where the fluid flowing through the conduit impinges upon the ball valve and seats it firmly against the valve seat 20. As the piston 48 is moved by the expanding compression spring 55, the fluid in bore 34, passages 39 and 41, annular groove 60, ports 86 and chamber 72 is forced past valve 100 (which is unseated), into chamber 74, through ports 88, annular groove 15, port 14, and out the conduit 4.

From the above description it is evident that I have provided a fluid flow control device which fulfills the desired objects of this invention. While I have illustrated a particular embodiment of my invention, I do not intend thereby to limit myself to the exact details of construction set forth for the invention embraces such changes and modifications that come within the scope and spirit of the appended claims.

I claim:

1. A device for controlling the flow of fluid under pressure comprising a substantially straight conduit thru which said fluid flows, from an upstream end to a downstream end, a first bore intersecting said conduit, a main valve seat in said conduit immediately adjacent said first bore on the downstream side thereof, a main valve member on the upstream side of said main valve seat, a second bore in axial alignment with said first bore, a transverse wall separating said bores, a main valve stem reciprocally mounted axially of said bores and extending through said transverse wall, a substantially fluid-tight seal between said main valve stem and said transverse wall, said main valve member being swingably mounted on the inner end of the stem whereby said valve member is held against said main valve seat by fluid pressure when in closed position a piston mounted on said main valve stem within said second bore, said main valve stem being connected to said main valve member in such a manner as to withdraw said main valve member into said first bore when said piston moves away from said transverse wall and to move said main valve member into engagement with said main valve seat when said piston moves toward said transverse wall, a spring in said second bore urging said piston toward said transverse wall, control means for actuating said piston comprising a chamber adjacent said conduit, a first passage connecting said conduit upstream of said main valve seat with said chamber, a first control valve in said first passage, a second passage connecting said conduit downstream of said main valve seat with said chamber, a second control valve in said second passage operatively connected to said first control valve, spring means normally urging said first control valve toward a closed position and said second control valve toward an open position, a passageway connecting said chamber between said first and second control valves with said second bore between said piston and said transverse wall, finger-actuated means for simultaneously opening said first control valve and closing said second control valve, whereby some of the fluid in said conduit will pass thru said first passage, said chamber, and said passageway to said second bore and push said piston away from said transverse wall, thereby retracting said main valve stem and drawing said main valve member away from said main valve seat and into said first bore, a cap closing the end of said second bore, said main valve stem having an outer end passing thru said cap, an enlargement of non-circular cross-section on said outer end, a central portion in said cap surrounding said outer end, said central portion having an opening of the same cross section as said enlargement, whereby said main valve stem may move within said opening only when said enlargement is in alignment with said opening, said main valve stem and said central portion being relatively rotatable, said central portion thereby acting as a safety lock when said enlargement is out of alignment with said opening.

2. A device for controlling the flow of fluid comprising a substantially straight conduit through which fluid flows from an upstream end to a downstream end, a first bore intersecting said conduit, a main valve seat in said conduit immediately adjacent said bore on the downstream side thereof, said main valve seat comprising a plate positioned substantially at right angles to said conduit and having a circular opening therethrough, a substantially spherical main valve member of larger diameter than said opening on the upstream side thereof and adapted to seat in said opening when in a closed position and to lie within said bore when in an open position, a second bore in axial alignment with said first bore, a transverse wall separating said bores, a main valve stem reciprocally mounted axially of said bores, and extending through said transverse wall, a substantially fluid tight seal between said main valve stem and said transverse wall, a piston mounted on said main valve stem, within said second bore, a universal connection between said substantially spherical main valve member and said main valve stem whereby when said piston moves away from said transverse wall said main valve stem withdraws said main valve member into said first bore while when said piston moves toward said transverse wall said main valve stem moves said main valve member into engagement with said main valve seat, where it seats itself in said circular opening under pressure of fluid in said conduit, a spring in said second bore urging said piston toward said transverse wall, control means for actuating said piston comprising a chamber adjacent said conduit, a first passage connecting said conduit upstream of said main valve seat with said chamber, a first control valve in said first passage, a second passage connecting said conduit downstream of said main valve with said chamber, a second control valve in said second passage operatively connected to said first control valve, spring means normally urging said first control valve toward a closed position and said second control valve toward an open position, a passageway connecting said chamber between said first and second control valves with said second bore between said piston and said transverse wall, finger-actuated means for simultaneously opening said first control valve and closing said second control valve, whereby some of the fluid in said conduit will pass thru said first passage and said chamber to said second bore and push said piston away from said transverse wall, thereby retracting said main valve stem and drawing said main valve member away from said seat and into said first bore.

3. A device for controlling the flow of fluid comprising a body member containing a substantially straight conduit for said fluid, a grip member on the underside of said body member and extending at an angle thereto, a main valve seat in said conduit substantially at right angles thereto, and containing a circular opening, a substantially spherical main valve member of larger diameter than said opening on the upstream side of said valve seat and positioned to seat in said opening when in a closed position, a first bore in said grip member intersecting said conduit at an angle immediately upstream of said main valve seat, a main valve stem positioned axially in said first bore and having a universal connection with said valve member, a second bore in said grip member in axial alignment with said first bore, a transverse wall separating said first and second bores, said valve stem extending thru said wall in sealed relation therewith, fluid-actuated means in said second bore for longitudinally moving said valve stem, control means for said fluid actuated means comprising a third bore above and parallel to said conduit, said control means comprising a tubular member removably mounted in said third bore, said tubular member comprising three axially aligned chambers, an upstream chamber, a central chamber and a downstream chamber, a control valve stem extending axially along said chambers and having a projecting end extending from said tubular member and from said body member, a first control valve member in said upstream chamber and a second control valve member in said downstream chamber, said control valves being mounted on said control valve stem, one adjacent each end of said central chamber so as to control the flow of fluid from said upstream chamber to said central chamber and from said central chamber to said downstream chamber, said control valve members being spaced on said stem so that when said control valve stem is moved longitudinally in a first direction said first control valve is opened and said second control valve is closed, while when said control valve stem is moved longitudinally in a second direction said first control valve is closed and said second control valve is opened, a spring within said tubular member urging said valve stem in said second direction, a trigger mounted on said body member, said trigger having a portion adjacent said grip member engageable by the finger of an operator and a portion contacting said projecting end of said control valve stem and arranged to push said control valve stem in said first direction when the trigger is pulled by an operator, passages connecting said upstream and downstream chambers with said conduit upstream and downstream of said main valve, respectively, and passageways connecting said central chamber with said second bore for actuation of said fluid actuated means, whereby when said trigger is pulled some of said fluid will pass from said conduit thru said upstream chamber, said central chamber and said passageways to said second bore and cause said main valve stem to unseat said spherical main valve member and retract it into said first bore.

References Cited in the file of this patent

UNITED STATES PATENTS

| | | |
|---|---|---|
| 2,180,320 | Hansen | Nov. 14, 1939 |
| 2,357,657 | Jensen | Sept. 5, 1944 |
| 2,445,163 | Williamson | July 13, 1948 |
| 2,564,896 | Gustafsson et al. | Aug. 21, 1951 |
| 2,650,615 | Nesham | Sept. 1, 1953 |

FOREIGN PATENTS

| | | |
|---|---|---|
| 664,746 | Germany | Sept. 5, 1938 |